3,529,968
COUNTERCURRENT SLURRY EXTRACTION OF COFFEE EXPELLER CAKE
Eddy R. Hair, Colerain Township, Hamilton County, Ohio, and Donovan Francis Dasher, Pacifica, Calif., assignors to The Procter & Gamble Company, Cincinnati, Ohio, a corporation of Ohio
Filed Dec. 18, 1967, Ser. No. 691,411
Int. Cl. A23f 1/08
U.S. Cl. 99—71                                    1 Claim

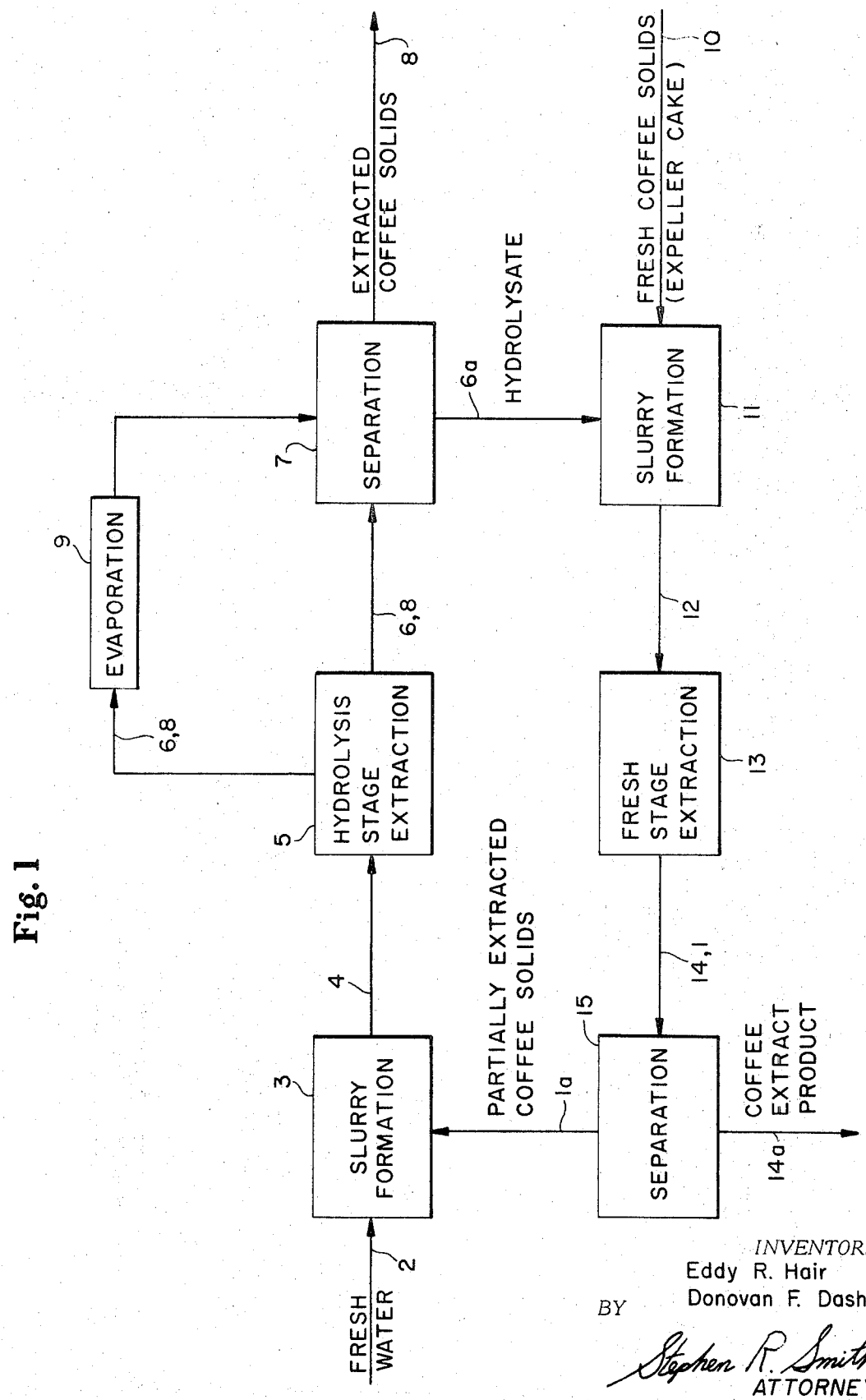

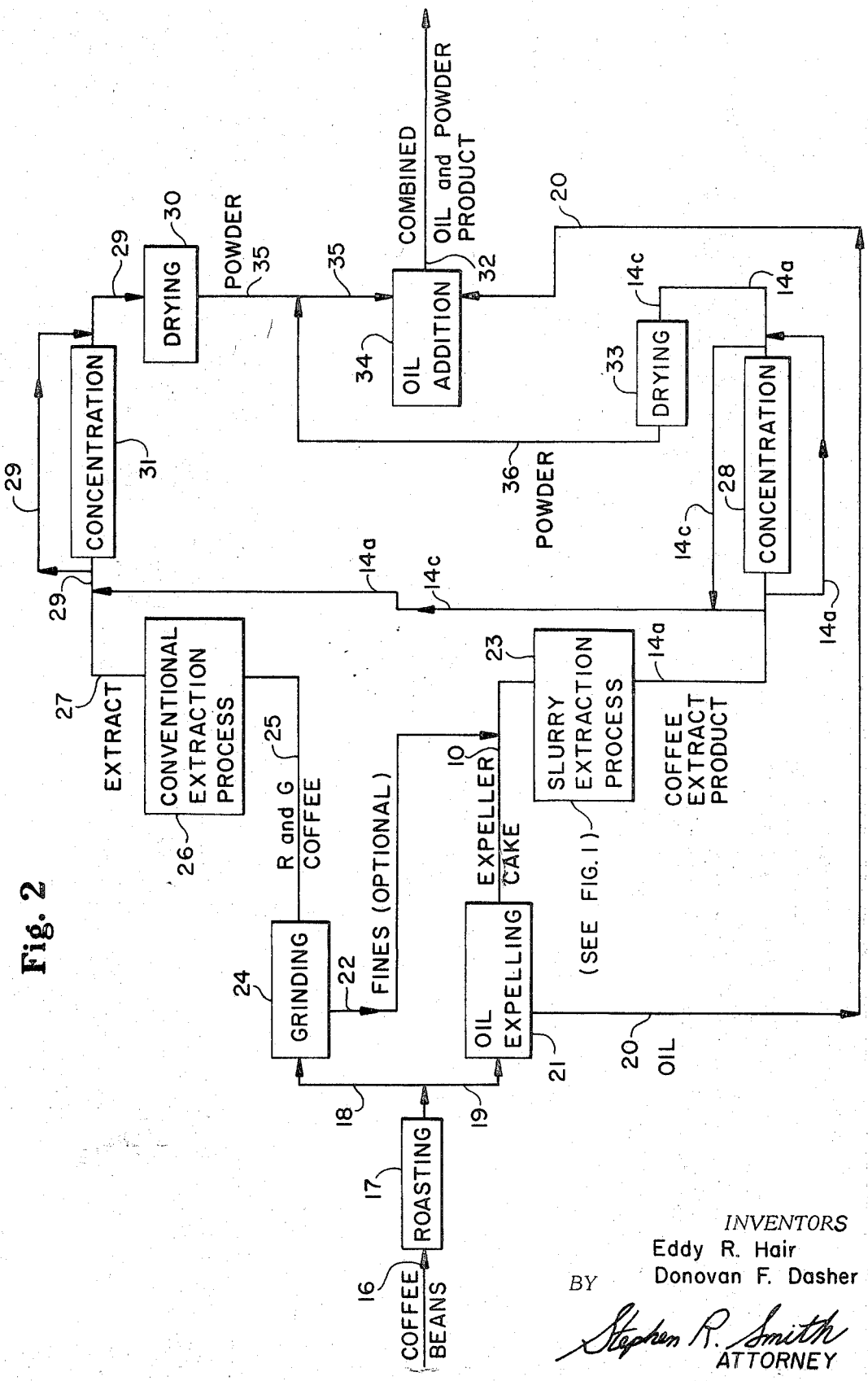

ABSTRACT OF THE DISCLOSURE

Coffee expeller cake is extracted by a countercurrent slurry extraction process which involves a fresh stage and a hydrolysis stage. The slurry extraction process can be combined with a conventional process in the overall production of instant coffee.

BACKGROUND OF THE INVENTION

The field of this invention is extraction of water-soluble materials from roasted coffee in the production of an instant coffee product. The invention itself relates to slurry extraction of coffee fines and expeller cake. More specifically, the invention relates to a novel method of extracting coffee solubles from the small particle size portions of roast and ground coffee and particularly from the expeller cake residue remaining when coffee oil is expelled from roasted coffee beans.

Coffee manufacturers have found coffee oil to be a desirable ingredient of instant coffee products. The oil is obtained from coffee beans, most generally by expelling the oil from roasted beans. The expeller cake which is left contains water-soluble coffee materials and, in commercial practice, it is economically feasible to use coffee oil only if the expeller cake can also be extracted in the instant coffee process. Thus, the expeller cake cannot be discarded because of the valuable nature of coffee and the significant level of water-soluble materials in the expeller cake.

However, the expeller cake per se cannot be readily put into conventional extraction (percolation) columns containing normal particles of roast and ground coffee. The cake particles do not have a rigid cell structure and lose their structural integrity when contacted with water. Hence, addition of expeller cake causes clogging of the coffee bed and loss of capacity in the percolation column.

The problems caused by fines (the fine portion of roast and ground coffee) an despectially the problems caused by expeller cake in conventional percolation columns are well recognized in the art and several solutions have been offered. For example, U.S. Pat. 2,931,728 teaches the blending of coffee fines with expeller cake to form pellets. The pellets are then added along with normal particles of roast and ground coffee to the percolation columns.

In accordance with the present invention, expeller cake, optionally combined with a portion of the fine particles obtained from the grinding operation in preparing roast coffee for conventional percolation column extraction, is extracted separately in a countercurrent slurry process. Thus, expeller cake and other fine materials can be removed from the conventional percolation column process and this increases column capacity and results in general improvement in column operation. Moreover, and more importantly, the specific countercurrent slurry extraction process of the present invention provides an unexpectedly high and economical recovery of flavorful, water-soluble components from coffee expeller cake.

SUMMARY OF THE INVENTION

The countercurrent slurry extraction process of this invention is characterized by two distinct extraction stages. In one stage, referred to herein as the "hydrolysis" stage, a slurry of partially extracted coffee solids obtained in the other stage is extracted with fresh water at hydrolysis conditions comprising high pressure and temperature to yield a hydrolysate. In the other stage, referred to herein as the "fresh" stage, a slurry of fresh coffee solids, e.g., expeller cake, is extracted with the previously obtained hydrolysate at moderate pressure and temperature to yield a coffee extract product.

In other words, the process of the invention is countercurrent because the hydrolysate (which contains coffee solubles) from the hydrolysis stage is used to extract fresh coffee solids in the fresh stage. The partially extracted coffee solids obtained from the fresh stage are extracted with fresh water in the hydrolysis stage. The extract obtained from the fresh stage is the product of the process. The process can be carried out in a batch or continuous manner. The term "hydrolysate" is used herein to define a water extract of hydrolyzed coffee solubles.

The coffee extract obtained from the slurry extraction process of this invention can be separately concentrated and/or dried according to methods well known in the coffee art to form an instant coffee powder which can be used per se or combined with powder obtained from a conventional process, or the extract can be combined with conventional percolation column extract and dried therewith in the overall production of an instant coffee product.

In essence, the invention provides a countercurrent slurry extraction process for the production of coffee extract (preferably in greater than about 35% yield) from coffee expeller cake, which comprises:

(a) combining partially extracted coffee solids with fresh water to form a slurry containing from about 3% to about 20% coffee solids;

(b) extracting the slurry of step (a) at hydrolysis conditions comprising a pressure of from about 65 p.s.i.a. to about 185 p.s.i.a. and a temperature of from about 300° F. to about 375° F. for a time of from about 3 minutes to about 30 minutes (preferably while agitating, most preferably at a Turbine Reynolds Number greater than $10^5$) to form a hydrolysate containing from about 0.5% to about 5% coffee solubles;

(c) separating the hydrolysate of step (b) from the coffee solids;

(d) combining the hydrolysate of step (c) with fresh coffee solids comprising coffee expeller cake to form a slurry containing from about 5% to about 20% coffee solids;

(e) extracting the slurry of step (d) at conditions comprising a pressure of from about 7.5 p.s.i.a. to about 35 p.s.i.a. and a temperature of from about 180° F. to about 230° F. for a time of from about 3 minutes to about 25 minutes (preferably while agitating, most preferably at a Turbine Reynolds Number greater than $10^5$) to form an extract containing from about 3% to about 20% coffee soluble; and (f) separating the extract of step (e) from the coffee solids;

the extract of step (f) comprising the product of the process and the coffee solids of step (f) comprising the partially extracted coffee solids of step (a).

BRIEF DESCRIPTION OF THE DRAWINGS

FIG. I is a schematic diagram of the slurry extraction process described above. The fresh stage extraction and the hydrolysis stage extraction are indicated by (13) and (5) respectively.

FIG. II is a schematic diagram of the slurry extraction process (23) utilized in combination with a conventional extraction process (26).

DESCRIPTION OF THE PREFERRED EMBODIMENTS

For several years major coffee processors have expelled coffee oil from freshly roasted coffee beans and then sprayed the oil onto instant coffee powder as it is packed in a jar in a carbon dioxide atmosphere. The residue remaining from the expelling operation is referred to as expeller cake and is the primary starting material in the slurry extraction process of this invention.

Coffee oil expellers are commercially available. Oil expelling equipment and methods are described in Sivetz and Foote, Coffee Processing Technology, Avi Publishing Co., Westport, Conn., 1963, vol. 2, pp. 27–30. In typical operation of an oil expeller, the roasted coffee beans are steam heated, e.g., 150 p.s.i.g., 375° F., by an entering screw jacket, or moistened, to help soften the coffee. A motorized choke valve on the discharge end of the expeller controls the back pressure, e.g., 50 tons on the extruded expelled cake, and an ammeter control on the main driving motor, e.g., about 50 HP, controls the rate of coffee feed. Because of the great amount of frictional heat developed during the expelling process, the central shaft of the expeller is generally water cooled. A series of short replaceable blades rotating at about 20 r.p.m. compresses the coffee as it is pushed and pressed forward. The coffee oil comes out of peripheral slots that are only a few thousandths of an inch wide. The coffee oil is hot, e.g., about 180° F., when it leaves these slots and it is preferably immediately cooled to room temperature or lower.

Roasted coffee beans of the type used for oil expelling generally contain about 12%–14% coffee oil and commercial expellers generally yield about half or more of the coffee oil present in the beans. Therefore, the expeller cake starting material in the extraction process of this invention generally contains from about 3% to about 8%, preferably from about 4% to about 7% coffee oil. In the process of expressing the coffee oil, the roasted coffee is subdivided and compressed with the result that a considerable proportion of the expeller cake particles produced do not have a rigid cell structure. The cake also contains a large portion of very fine particles. For example, the expeller cake issuing from a typical expeller contains about 50% coffee particles of a size passing a No. 50 mesh U.S. Standard screen.

The starting material in the slurry extraction process preferably consists essentially of expeller cake. However, the starting material can contain, in combination with the expeller cake, up to about 50% fines obtained from the grinding operation of a conventional instant coffee process. For the above-stated purpose, fines are defined as roast and ground coffee particles which pass through a No. 8 mesh U.S. Standard screen.

In one step of the slurry extraction process, fresh coffee solids comprising expeller cake, and optionally fines, as described above are combined with a hydrolysate (obtained in a subsequently described step) containing from about 0.5% to about 5% coffee solubles to form a slurry. Sufficient coffee solids should be used with the hydrolysate so that the amount of coffee solids comprises from about 5% to about 20%, preferably from about 6% to about 10%, by weight of the slurry. If necessary to obtain the specified concentration, some fresh water can be utilized with the hydrolysate. Preferably, the slurry is formed by mixing, e.g., with a turbine agitator.

The term "slurry" is used in a conventional sense herein to designate a suspension of solid material (coffee solids) in a liquid carrier (hydrolysate or water). A slurry of expeller cake does not possess a high degree of physical stability and thus preferably requires mixing for its formation and/or maintenance as is further discussed herein.

In the fresh stage extraction step of the process, the above-described slurry is extracted at conditions comprising a pressure of from about 7.5 p.s.i.a. to about 35 p.s.i.a. and a temperature of from about 180° F. to about 230° F. for a time of about 3 minutes to about 25 minutes to form a coffee extract product containing from about 3% to about 20% coffee solubles. Preferred conditions for the fresh stage extraction are a pressure of from about 14 p.s.i.a. to about 15 p.s.i.a. (atmospheric) and a temperature of from about 200° to about 212° for a time of from about 12 minutes to about 20 minutes to form an extract containing from about 4% to about 8% coffee solubles.

It is preferable that the fresh stage extraction be carried out while agitating the slurry. It is desirable that sufficient agitation be imparted to the slurry so that a uniform slurry will be maintained and for other reasons discussed hereinafter. Suitable apparatus for this step of the process comprises a vented tank equipped with a steam jacket and a turbine agitator.

After the fresh stage extraction step, the fresh stage coffee extract (which is the desired product of the process) is separated from the partially extracted coffee solids (which are further extracted in the hydrolysis stage). The separation can be effected by any convenient means such as by filtering, e.g., with a plate and frame filter press, centrifuging, or settling. Preferably, separation is effected by centrifuging, most preferably in a continuous conveyor bowl centrifuge (also known as a continuous desludging centrifuge). In typical operation of a continuous conveyor bowl centrifuge, slurry feed flows into the middle of the bowl through a stationary tube. The centrifugal action of the bowl ($\sim$200 g.) forces the slurry to the periphery of the bowl where the greater density solids settle to the outside. A screw conveyor, which is revolving at a rate slightly different from the bowl, forces the coffee solids to discharge ports where centrifugal force ejects the solids from the bowl. The coffee extract flows to the other end of the bowl and out over a plate dam.

The partially extracted coffee solids separated from the fresh stage extraction step are combined with fresh water to form a slurry. Sufficient fresh water should be used so that the slurry will contain from about 3% to about 20% coffee solids, preferably from about 5% to about 10% coffee solids. Preferably, the slurry is formed by mixing, e.g., with a turbine agitator.

In the hydrolysis stage, the above-described slurry comprising fresh water and partially extracted coffee solids is extracted at hydrolysis conditions comprising a pressure of from about 65 p.s.i.a. to about 185 p.s.i.a. and a temperature of from about 300° F. to about 375° F. for a time of from about 3 minutes to about 30 minutes to form a hydrolysis containing from about 0.5% to about 5% coffee solubles. Preferred conditions for the hydrolysis stage comprise a pressure of from 120 p.s.i.a. to about 175 p.s.i.a. and a temperature of from about 340° F. to about 365° F. for a time of from about 8 minutes to about 18 minutes to form a hydrolysate containing from about 1% to about 3% coffee solubles.

It is preferable that the hydrolysis stage extraction be carried out while agitating the slurry. It is desirable that sufficient agitation be imparted to the slurry so that a uniform slurry will be maintained and for other reasons discussed below. The hydrolysis stage can be carried out in any suitable apparatus, preferably in a closed pressure reaction vessel equipped with a steam jacket or a steam injection system and/or a turbine agitator. An alternative apparatus for the hydrolysis stage is referred to as a "pipeline reactor" (or pipeline hydrolyzer) wherein the slurry is pumped under pressure through an elongated, heated narrow pipe for the specified residence time. The pipe is equipped with sufficient curves or other restrictions on flow and this, combined with the positive pressure in the system, imparts turbulent flow to the slurry and thus provides the preferred agitation. For example, a pipeline hydrolyzer having a length of 20 feet and an inside diameter of 1.25 inches and having two right-angle turns, has been used in a satisfactory manner for the hydrolysis step.

After the hydrolysis stage extraction step and prior to separation of the slurry components, an intermediate step can comprise evaporating a portion of the hydrolysate. This step is not essential to the process but is preferably included to optimize the flavor of the final instant coffee. Since the slurry is under high pressure at this point in the process, the evaporation can be effected by pumping the slurry into an open tank whereby the pressure is suddenly released and a portion of the water is "flashed" into the atmosphere. This step preferably evaporates from about 10% to about 20% of the hydrolysate (water portion). However, the concentration of coffee solubles in the hydrolysate generally remains within the range specified above. For example, when a slurry comprising hydrolysate containing 1.85% coffee solubles is evaporated to remove 15% of the water, the concentration of coffee solubles in the hydrolysate is increased to 2.17%.

After the hydrolysis stage and the optional evaporation step, the hydrolysate is separated from the spent coffee solids which are then discarded. The hydrolysate is used to extract the fresh coffee solids in the fresh stage extraction step described hereinbefore. The separation of hydrolysate from spent coffee solids can also be effected by conventional means such as by filtering or centrifuging in the same manner as the fresh stage separation. The hydrolysis stage separation is also preferably effected by centrifuging, preferably in a continuous conveyor bowl centrifuge.

For convenience and clarity, the order of the countercurrent slurry extraction process has been described above in terms of the fresh stage extraction step followed by the hydrolysis stage extraction step. As is apparent to those skilled in the art, in either a continuous or batch process the order of steps is not material. In a batch process, however, a start-up step is often desirable. The start-up step can comprise extracting fresh coffee solids with fresh water at the fresh stage extraction conditions specified herein to provide partially extracted coffee solids for use in the hydrolysis step. The extract from this step can be separately processed, e.g., added to another extract and ultimately dried to an instant coffee powder.

As noted before, it is preferred that each of the extraction stages, i.e., the fresh extraction stage and the hydrolysis stage, be carried out while agitating the slurry, e.g., by mixing with an agitator or mixing by steam injection. The reason for preferably agitating the slurry is explained as follows: Due to the very fine nature of the coffee solids used in the slurry extraction process of this invention, and due to the lack of structural integrity and non-rigid cell structure of coffee expeller cake particles, water solutions of these materials tend to be difficult to handle and extract, e.g., they might sometimes form a "muddy" or "sludgy" mass on settling, or form a "floating island" during extraction as compared to a uniform and readily flowable slurry. Agitation is therefore preferred to insure maintenance of a uniform slurry which in turn results in proper extraction for the production of a flavorable extract in high yield. Most preferably, each extraction stage is carried out while agitating the slurry at a Turbine Reynolds Number greater than about $10^5$. In essence, the Turbine Reynolds Number defines the degree of turbulence being generated by a given agitation system. It has been discovered that a minimum degree of turbulence defined by a Turbine Reynolds Number of about $10^5$ in the slurry during the extraction stages of the present invention is necessary to give the most preferred results in terms of the overall yield and/or flavor of the extract. A highly preferred Turbine Reynolds Number is from about $10^6$ to about $10^7$.

As is well known in the chemical engineering art, Turbine Reynolds Number is dimensionless and can be computed by the formula $$N_{Re} = \frac{\pi T^2 R}{V}$$

wherein $N_{Re}$ is the Turbine Reynolds Number, $\pi$ is 3.14159, T is the turbine diameter in feet, V is the kinematic viscosity in ft.$^2$/hour, and R is the speed of the turbine in revolutions per hour. The above formula is applicable to tank (cylindrical) reaction vessels equipped with turbine agitators which are the preferred equipment for use in the extraction stages of the present invention. If a pipeline hydrolyzer is used for the hydrolysis stage, turbulence preferably corresponds to an equivalent Reynolds Number. Further discussion on computation of Turbine Reynolds Numbers is found in the American Institute of Chemical Engineering Journal, page 289, vol. 6, No. 2 (June 1960), and in Brown et al. in their well-known text Unit Operations, Wiley, New York (1950), pp. 136–141.

As noted hereinbefore, the fresh stage extract, which contains from about 3% to about 20%, preferably from about 4% to about 8%, coffee solubles is the desired product of the present slurry extraction process. Thus, the process provides an overall yield of at least about 35% vention with reference to FIG. 1, partially extracted coffee solids starting material used in the fresh stage extraction. Preferably, the overall yield is within the range of from about 40% to about 55%. From about 50% to about 80% of the overall yield is obtained in the fresh stage and from about 20% to about 50% of the overall yield is obtained in the hydrolysis stage.

Summarizing the slurry extraction process of this invention with reference to FIG. 1, partially extracted coffee solids (1a) and fresh water (2) are combined (3) to form a slurry (4), e.g. by mixing with a turbine agitator. The slurry (4) is extracted (5) at hydrolysis conditions to form a hydrolysate (6) which is separated (7) from the extracted coffee solids (8), preferably after an evaporation step (9). The hydrolysate (6a) and fresh coffee comprising expeller cake and optionally fines (10) are then combined (11) to form a slurry (12), e.g., by mixing with a turbine agitator, which is then extracted (13) in a fresh stage to form an extract (14) and partially extracted coffee solids (1). The extract (14) is then separated (15) as the product of the process (14a) from the partially extracted coffee solids (1), which in turn (1a) are combined with fresh water (2) to form the slurry (4) in the first step described above.

The fresh stage extract product of the slurry extraction process can be dried by conventional methods to form a useful instant coffee powder. For example, the extract can be spray-dried or freeze-dried, with or without an intermediate concentration step. Alternatively, the extract can be added to an extract obtained from conventional percolation column extraction of roast and ground coffee, and the two extracts can be dried together. In a preferred embodiment of the invention the slurry extraction process is used in combination with a conventional extraction process, e.g., a percolation extraction process, in the overall production of an oil-aromatized instant coffee product. Details on this embodiment of the invention are set forth below.

Coffee beans suitable for the production of instant coffee are first roasted in the conventional manner. Typical roasting equipment and methods for roasting coffee beans are described, for example, in Sivetz and Foote, Coffee Processing Technology, Avi Publishing Company, Westport, Conn., 1963, vol. 1, pp. 203–206.

The roasted beans are divided into two portions, a major portion for conventional extraction preferably comprising from about 85% to about 98% of total and a minor portion for oil expelling and slurry extraction of the expeller cake preferably comprising from about 2% to about 15% of the total. The major and minor portions can be obtained from the same blend of roasted coffee or each can comprise a separate blend of roasted coffee beans.

The major portion, e.g., 90% of the roasted coffee beans are ground, preferably to a U.S. Standard screen size of from about 8 mesh to about 20 mesh. Typical grinding equipment is described, for example, in Sivetz and Foote, supra, pp. 239–250.

The major portion of the roast and ground beans is extracted in a conventional manner, preferably in a multi-column extraction train. This system is composed of a number of elongated percolation columns connected in series for continuous countercurrent operation. While in these columns and prior to extraction, the roast and ground coffee can be distilled to remove a volatile flavor fraction, and the flavor fraction can be condensed. The distillation often is accomplished by passing steam through a coffee column for from about 10 to about 45 minutes. The condensate can be added immediately to a previously-obtained extract. If not, it should be chilled to about 40° F. or less and maintained at that temperature until such time as it is added to an extract. Once the distillation operation is completed, the coffee is extracted by admitting hot water, e.g., from about 320° F. to about 375° F., to the last column of the extraction train. The temperature decreases as the water passes through the system and is withdrawn from the column containing the freshest (previously unextracted) roast and ground coffee at a temperature of from about 90° F. to about 230° F. Typical disclosures of equipment and methods which can be used in the above operations are as follows: Steam distillation—Sivetz, supra, pp. 43–46, and U.S. Pat. 2,562,206, to Nutting, July 31, 1951. Extraction—Sivetz & Foote, supra, pp. 261–378, and U.S. Pat. 2,515,730, Ornfelt, July 18, 1950.

The minor portion of the roasted beans is subjected to an oil-expelling operation to form expeller cake and coffee oil. Alternatively, these beans can also be ground prior to expelling. The coffee oil obtained from the expelling operation is chilled, e.g., to about 40° F. or less, and is stored for later use such as addition to instant powder prior to packaging. The expeller cake, optionally combined with up to about 20% fines obtained from grinding the major portion, is then extracted by the countercurrent slurry extraction process described hereinbefore to provide an extract.

The two extracts, i.e., the extract from the conventional percolation column extraction process and the extract product from the slurry extraction process can be independently dried to form intant coffee powders and the powders can be admixed and the oil sprayed thereon to form an aromatized instant coffee powder, i.e., a combined oil and powder product. Preferably, however, the extracts are combined prior to drying. Thus, the extract obtained from the slurry extraction process of expeller cake is combined with the extract obtained from the conventional countercurrent percolation column extraction process of roast and ground coffee to form a single coffee extract.

Preferably, the extract from the slurry extraction process, which contains from about 3% to about 20% coffee solubles, is concentrated to from about 20% to about 30% coffee solubles prior to combination of this extract with the conventional extract (which generally contains from about 25% to about 45% coffee solubles). Thus, the combined extract preferably contains from about 24% to about 40% coffee solubles. The extract from the slurry process can be concentrated by any conventional method, preferably by vacuum evaporating at a temperature of from about 120° F. to about 165° F. and a pressure of from about 18 to about 26 inches of mercury.

It is preferable for the combined extract to also be concentrated, preferably to at least 45% coffee solubles prior to drying. The high concentartion of coffee solubles helps to preserve certain coffee flavor materials from deterioration. Concentration of the combined extract can also be any conventional method such as freeze concentration, thin film evaporation, and flashing, or by the addition of a previously-dried coffee powder.

The next step in the process involves drying the combined, and preferably concentrated, extract to an instant coffee powder. While any convenient drying method can be used, the most common drying method is spray drying. Spray drying procedures, particularly as related to instant coffee products, are well known in the art and need not be described in detail herein. Typical disclosures on spray drying processes and equipment are found in Sivetz and Foote, supra, vol. 1, chapters 11 and 12.

Alternatively, the combined coffee extract can be freeze-dried. Freeze-dried instant coffee is prepared by freezing a coffee extract prepared as described above. The frozen extract, granulated if desired, then is placed in a chamber under vacuum (preferably less than 500 microns of mercury absolute pressure) and maintained at low temperatures (preferably less than −15° F.). Heat then is applied to remove water from the frozen extract by sublimation. Processes of this type are often capable of achieving excellent flavor retention during drying.

The type of freeze-drying equipment which can be used in preparing the freeze-dried coffee described above is well known to those skilled in the art. Many manufacturers produce commercial and laboratory-size freeze dryers which are useful in preparing freeze-dried coffee. Thus, freeze-dried coffee from the extracts disclosed herein can be prepared by any known freeze-drying process. Typical disclosures relating to processes and equipment for freeze-drying can be found, for example, in Copley and Van Arsdel, Food Dehydration, Avi Publishing Co., Westport, Conn., 1964, vol. 2, pp. 105–31; Perry Chemical Engineers' Handbook, McGraw-Hill Book Company, New York, 4th ed., 1963, pp. 17–26 to 17–28; Tressler and Evers, The Freezing Preservation of Foods, Avi Publishing Co., Westport, Conn., vol. 1, pp. 612–26; and in U.S. Pat. 2,751,687 to Colton, issued June 26, 1956.

As a final step in the process, the oil expelled previously, and preferably preserved by chilling, is added to the instant coffee powder. Instant coffee powder from another source can also be blended in at this point. The oil can be added to the powder in a conventional aromatization step to form an aromatized instant coffee product. This can be accomplished by any of the well-known methods, e.g. by spraying oil onto the instant coffee powder under an inert atmosphere. Alternatively, the oil can be blended into the coffee powder and the powder-oil mixture can then be milled into oil-containing flakes of instant coffee. In any event, the end product is a desirable and useful oil-containing instant coffee product.

Therefore, a preferred embodiment of the present invention provides a process for the production of instant coffee, which comprises: (a) dividing roasted coffee into a major portion and a minor portion; (b) expelling oil from the minor portion of step (a) to form coffee oil and coffee expeller cake; (c) extracting the coffee expeller cake of step (b) by the slurry extraction process described herein to form a coffee extract; (d) extracting the major portion of step (a) by a conventional extraction process, preferably a countercurrent percolation extraction process, to form an extract; (e) combining the extract of step (c) with the extract of step (d) to form a combined extract; (f) drying the combined extract of step (e) to form instant coffee powder and (g) adding the coffee oil of step (b) to the instant coffee powder of step (f). In a preferred embodiment of this process, the extract of step (c), which contains from about 3% to about 20% (preferably from about 4% to about 8%) coffee solubles, is concentrated to from about 15% to about 30% coffee solubles before it is combined in step (e). In a further preferred embodiment of the process, the combined extract of step (e), which preferably contains from about 24% to about 40% coffee solubles, is concentrated to at least about 45% coffee solubles prior to drying in step (f). The above combination of steps provides an overall process for the high yield production of a well-flavored, oil-containing instant coffee product.

Summarizing the above-described production of instant coffee wherein the slurry extraction process is combined with a conventional extraction process, and referring to FIG. 2, a major portion (18) and a minor portion (19) of roasted (17) coffee beans (16) provide the starting materials. The major portion and the minor portion can be obtained from the same or a separate batch of beans. Oil (20) is expelled (21) from the minor portion of roasted beans (19) leaving expeller cake (10) which, optionally combined with fines (22) is extracted by the slurry process (23) of FIG. 1 to yield an extract product (14a). The major portion of coffee beans (18) is conventionally ground (24) and the resulting roast and ground (R and G) coffee (25), optionally with some of the fines (22) removed, is extracted in a conventional manner (26), e.g., in a train of countercurrent percolation columns, to yield a conventional extract (27). After a preferred concentration step (28), the slurry extraction process extract product (14a) and (14c) and the conventional extract (27) can be combined (29) and dried (30), preferably with an intermediate concentration step (31), to form an instant coffee powder (35) to which the oil (20) is added (34) to form a combined oil and powder product (32). Alternatively, the slurry extract (14a) or (14c) can be dried (33) to form an instant coffee powder (36) which in turn can be combined with the instant coffee powder (35).

In the following examples and otherwise herein, all percentages, proportions and ratios are by weight unless otherwise so indicated. The abbreviation "p.s.i.a." is used to designate pressure in pounds per square inch absolute.

Example I

This example illustrates the preparation of an instant coffee product utilizing the invention slurry extraction process which provides a high yield of coffee solubles from coffee expeller cake.

In a start-up step, 9.9 pounds of fresh coffee expeller cake obtained from a commercial oil expelling operation were mixed with 90.1 pounds of fresh water in a 17-gallon vented cylindrical tank equipped with a steam jacket and a 6-bladed turbine agitator (8-inch turbine diameter) rotating at 500 revolutions per minute to form a slurry containing 9.9% coffee solids. Mixing was continued with the turbine agitator at a Turbine Reynolds Number of about $10^7$ for 15 minutes at atmospheric pressure and a temperature of about 209° F. The slurry was filtered to give 6.8 pounds of partially extracted coffee solids and 70.1 pounds of extract containing 3.7% coffee solubles.

In a hydrolysis stage extraction step, 3 pounds of the partially extracted coffee solids from the start-up step were mixed with 42 pounds of fresh water in a 7.5 gallon cylindrical pressure reactor while agitating and heating by directly injecting steam into the reactor to form a slurry containing 6.7% coffee solids. Mixing of the slurry was continued by direct steam injection for 18 minutes at a pressure of about 185 p.s.i.a. and a temperature of about 362° F. The slurry was filtered to give 2.8 pounds of extracted coffee solids and 64.7 pounds of hydrolysate containing 2.8% coffee solubles. The yield for this step was calculated to be about 18.3%.

In a fresh stage extraction step, 9.9 pounds of fresh expeller cake, 57.2 pounds of hydrolysate from the previous step and 32.9 pounds of fresh water were mixed in a 17-gallon vented cylindrical tank equipped with a steam jacket and a 6-bladed turbine agitator (8-inch turbine diameter) rotating at 500 revolutions per minute to form a slurry containing 9.9% coffee solids. Mixing of the slurry was continued with the turbine agitator at a Turbine Reynolds Number of about $10^7$ for 15 minutes at atmospheric pressure and a temperature of about 209° F. The slurry was filtered to give 7.0 pounds of partially extracted coffee solids and 70 pounds of extract product containing 5.2% coffee solubles. The yield for this step was calculated to be 20.2%. The overall yield, based on the 9.9 pounds of fresh coffee solids starting material in the fresh stage extraction step, was 38.5%.

The above-prepared extract product is concentrated in a rising-falling film evaporator to a coffee solubles concentration of 19.4% and is then spray-dried to an instant coffee powder. Hot water can be added to the powder to provide an excellent cup of coffee.

In additional similar experiments it was shown that agitating at a Turbine Reynolds Number of about $10^7$ with a 6-bladed turbine agitator (8-inch turbine diameter, rotating at 500 revolutions per minute) during the hydrolysis step increased the yield to 21.8% in the hydrolysis step and increased the overall yield to 42.0%.

Example II

This example illustrates the preparation of an oil-containing instant coffee product by combining the invention slurry extraction process of expeller cake with a conventional extraction process.

2358 pounds of roasted coffee beans are divided into a major portion (2300 pounds) and a minor portion (58 pounds). The major portion is obtained from a blend of beans containing about 12% oil and the minor portion is obtained from a blend of beans containing 13% oil.

The major portion of roasted beans are ground and part of the fines (23 pounds) which pass through 20 mesh U.S. Standard screen are removed. The remainder of the roasted and ground beans (2277 pounds) are then extracted in a conventional multi-column extraction train to give 3820 pounds of conventional extract containing 25% coffee solubles.

The minor portion of roasted beans are passed through a commercial coffee oil expeller to give 5 pounds of oil and 53 pounds of expeller cake having a particle size where 50% of the particles pass through a 50 mesh U.S. Standard screen. The oil is chilled to 45° F. and saved for subsequent use.

The above-mentioned fines and expeller cake are combined to provide 76 pounds of coffee solids starting material for the invention slurry extraction process.

The 76 pounds of coffee solids are mixed with 742 pounds of hydrolysate containing 2.1% coffee solubles in a 150-gallon vented cylindrical tank equipped with a steam jacket and a 6-bladed turbine agitator (13-inch turbine diameter) rotating at 178 revolutions per minute to form a slurry containing 9.1% coffee solids. Mixing of the slurry is continued with the turbine agitator at a Turbine Reynolds Number of 107 for 12 minutes at atmospheric pressure (14.7 p.s.i.a.) and 212° F.

The slurry is centrifuged in a continuous desuldging centrifuge to give 53 pounds of partially extracted coffee solids and 676 pounds of extract product containing 5% coffee solubles. This represents a yield of 44.5% for the slurry extraction process.

The 53 pounds of partially extracted coffee solids are mixed with 666 pounds of fresh water in a 150-gallon cylindrical pressure reactor equipped with a steam injection system and a 6-bladed turbine agitator (12 inch turbine diameter) rotating at 190 revolutions per minute to form a slurry containing 5.9% coffee solids. Mixing of the slurry is continued with the turbine agitator at a Turbine Reynolds Number of $10^7$ for 18 minutes at a pressure of 155 p.s.i.a. and a temperature of 360° F. achieved by the steam injection system. The slurry is discharged from the pressure reactor to a vented (atmospheric pressure) collection tank which flashes 15% of the water.

The slurry is centrifuged in a continuous desuldging centrifuge to give 37 pounds of extracted coffee solids and 742 pounds of hydrolysate containing 2.1% coffee solubles. The hydrolysate is subsequently used to extract fresh coffee solids as described above.

The 676 pounds of extract product described above, which contains 5% coffee solubles, is concentrated in a rising-falling film evaporator at 24 inches Hg and 140° F. to give 167 pounds of extract product containing 20% coffee solubles.

The 167 pounds of extract product containing 20% coffee solubles is combined with the 3820 pounds of conventional extract previously prepared to give 3987 pounds of extract containing 24.8% coffee solubles. This combined extract is concentrated in a rising-falling film evaporator at 27 inches Hg and 100° F. to give 1976 pounds of extract containing 50% coffee solubles. This combined and concentrated extract is spray-dried to give 1015 pounds of instant coffee powder. The previously obtained oil is sprayed-on to the powder in proportions to give an oil-aromatized instant coffee product containing 0.5% oil.

What is claimed is:
1. A process for the production of an instant coffee product, which comprises:
 (a) dividing roasted coffee into a major portion and a minor portion;
 (b) expelling oil from the minor portion of step (a) to form coffee oil and coffee expeller cake;
 (c) extracting the coffee expeller cake of step (b) by a process which comprises:
  (1) combining partially extracted coffee solids with fresh water to form a slurry containing about 6.7% coffee solids:
  (2) extracting the slurry of step (1) at hydrolysis conditions comprising a pressure of about 185 p.s.i.a. and a temperature of about 362° F. for a time of about 18 minutes, while agitating the mixture at a Turbine Reynolds Number of about $10^7$, to form a hydrolysate containing about 2.8% coffee solubles;
  (3) evaporating from about 10% to about 20% of the hydrolysate;
  (4) separating the hydrolysate of step (3) from the coffee solids;
  (5) combining the hydrolysate of step (4) with fresh coffee solids comprising coffee expeller cake to form a slurry containing from about 5% to 10% coffee solids;
  (6) extracting the slurry of step (5) containing about 9.9% coffee solids at conditions comprising atmospheric pressure and a temperature of about 209° F. for a time of about 15 minutes, while agitating the slurry at a Turbine Reynolds Number of about $10^7$, to form an extract containing from about 5.2% coffee solubles; and
  (7) separating the extract of step (6) from the coffee solids;
 (d) concentrating the extract of step (c) to form about 20% to about 30% coffee solubles;
 (e) extracting the major portion of step (a) by a conventional extracting process, preferably a countercurrent percolation extraction process, to form an extract;
 (f) combining the extract of step (d) with the extract of step (e) to form a combined extract;
 (g) concentrating the combined extract of step (f) to at least about 45% coffee solubles in the extract;
 (h) drying the combined extract of step (g) to form instant coffee powder; and
 (i) adding the coffee oil of step (b) to the instant coffee powder of step (h).

References Cited

UNITED STATES PATENTS

| | | | |
|---|---|---|---|
| 2,687,355 | 8/1954 | Benner et al. | 99—71 |
| 3,035,922 | 5/1962 | Mook et al. | 99—71 |
| 3,224,879 | 12/1965 | Di Nardo | 99—71 |
| 3,361,572 | 1/1968 | Nutting et al. | 99—71 |
| 3,458,320 | 7/1969 | Niven | 99—71 |

DENNIS, E. TALBERT, JR., Primary Examiner

U.S. Cl. X.R.

23—267, 312